United States Patent

Hirsch et al.

[15] 3,642,350

[45] Feb. 15, 1972

[54] COMPUTER-GENERATED FILTERING METHOD

[72] Inventors: Peter M. Hirsch; James A. Jordan, Jr.; Louis B. Lesem, all of Houston, Tex.

[73] Assignee: International Business Machines Corporation, Armonk, N.Y.

[22] Filed: Nov. 26, 1969

[21] Appl. No.: 880,260

[52] U.S. Cl. ......................................... 350/162 SF, 235/181
[51] Int. Cl. ...................................... G06g 9/00, G02b 27/38
[58] Field of Search ....................... 350/3.5, 162 SF; 178/6.8; 235/181; 340/15.5

[56] References Cited

UNITED STATES PATENTS 3,388,240   6/1968   Robbins ............................... 350/162

OTHER PUBLICATIONS

Trabka, et al., Journal of the Optical Society of America. Vol. 54, No. 10, Oct. 1964, pp. 1242–1252

Lohmann, Applied Optics, Vol. 7, No. 3, March 1968. pp. 561–563

Lesem, et al., Communications of the ACM, Vol. 11. No. 10, Oct. 1968, pp. 661–673

*Primary Examiner*—David Schonberg
*Assistant Examiner*—Ronald J. Stern
*Attorney*—Hanifin and Jancin and John L. Jackson

[57] ABSTRACT

A method of optical filtering in which a phase object is constructed in accordance with the desired convolutional filter operator and during the filtering operation incoherent light is used. This type of incoherent filtering method is made applicable to filter operators having negative portions which would require negative intensities by biasing the phase object to make is everywhere nonnegative. The bias is then removed during display by means of a vidicon system.

7 Claims, 7 Drawing Figures

INVENTORS
PETER M. HIRSCH
JAMES A. JORDAN, JR.
LOUIS B. LESEM

BY John L. Jackson

ATTORNEY

INVENTORS
PETER M. HIRSCH
JAMES A. JORDAN, JR.
LOUIS B. LESEM

BY John R Jackson

ATTORNEY

COMPUTER-GENERATED FILTERING METHOD

BACKGROUND OF THE INVENTION

1. Field of the Invention

This invention relates to optical information processing and filtering in general, and more particularly, to that of computer-generated optical filters for use in an incoherent filtering system.

2. Description of the Prior Art

Optical information processing is a science of image processing using stops and diffraction patterns. Many mathematical procedures such as multiplication, correlation, etc., are possible using holographic diffraction patterns in a coherent optical system. Correlation can also be achieved in incoherent systems. These operations, together with others such as inverse filtering can be accomplished using computer-generated or synthetic holographic filters in the coherent optical system. One holographic filtering system is described in Applied Optics, Vol. 7, No. 3, Mar., 1968 at page 561.

An excellent text treatment is also presented in "Introduction to Fourier Optics," McGraw-Hill, by Joseph W. Goodman, Chapter 7—Spatial Filtering and Optical Information Processing.

The usual holographic optical filtering practice makes use of a laser as a coherent light source, several complicated optical elements, the holographic diffraction pattern, and a detection scheme. Inherent in holographic diffraction patterns are two or more diffraction orders. These may be separated angularly in a two-beam hologram. If they are not separated, the desired diffraction order is obscured by the undesired orders. If they are separated, the desired order is diffracted away at the expense of bandwidth from the optical axis of the laser. Several problems are presented by these conventional optical information processing systems. These include inefficient utilization of the available light since very little of the light from the object to be filtered is diffracted by the hologram into the desired order. Also, the requirement that orders be separated limits the spatial location of the image, which in turn limits the size and/or resolution of the object to be filtered. Additionally, such systems are usually costly and complex and, due to the extreme rigidity requirements of coherent imaging systems, require an optical bench. It is also well known that noise problems are also present in any coherent system. Noise may arise from dust and speckling or diffraction.

Finally, the applications available to coherent filtering systems are severely limited in that due to the requirement of coherent illumination "real-time" processing is virtually impossible. That is, if coherent systems are used, the image must be illuminated coherently. Data, which might be in electronic form, for example, must be converted and displayed in such a way that a photographic transparency can be made and this transparency illuminated. This step precludes real-time data processing.

Almost all of the problems associated with coherent, holographic optical processing systems can be eliminated if kinoforms are used. If kinoforms are used in incoherent systems, matched filtering or correlation may be accomplished.

The kinoform process is described in U.S. Pat. application Ser. No. 778,525, entitled "The Kinoform: Method of Manufacturing Wave Shaping Devices," by the inventors of the present invention and assigned to the same assignee as the present application. In addition, the kinoform process was described in a paper presented to the Optical Society of America Meeting on Mar. 13, 1969 and this paper is published in Volume 13, No. 2 of the IBM Journal of Research and Development, page 150 et seq.

The kinoform is a wave front reconstruction device which, like the hologram, provides the display of a three-dimensional image. In contrast to the hologram, however, the illuminated kinoform yields a single diffraction order and ideally, all the incident light is used to reconstruct the one image. All the spatial frequency content or bandwidth of the device is available for the single image. Computationally, kinoform construction is faster than hologram construction because reference beam and image separation calculations are unnecessary.

A kinoform operates only on the phrase of an incident wave front, being based on the assumption that only the phase information in a scattered wave front is required for the construction of an image of the scattering object. The amplitude of the wave front in the kinoform plane is assumed constant as is approximately true for any diffusely scattering object in the far field. Although it was first conceived as an optical focusing element, the kinoform can be used to transform the wave front of any physical waveform; e.g., ultrasound or microwaves.

The ability to transform a wave front at will permits the use of the kinoform to represent a class of mathematical operators. These operators are real, nonnegative, convolutional operators, of which the correlation operators or matched filter are a particular example.

Because of the random phase assumption made in the construction of kinoforms, they cannot be used in coherent optical processing systems. However, kinoforms are ideally suited for use in incoherent systems. As with holographic filters operating in incoherent systems, the operations are performed on intensities, rather than amplitudes. Thus, basic kinoformic systems are applicable to operations which are real and nonnegative, such as matched filtering. The basic kinoform filtering system is the subject of a patent application entitled "Kinoform Matched Filter Method" by Adolph W. Lohmann, Ser. No. 880,258 filed on the same day as the present application and assigned to a common assignee.

Other related applications are "A Method for Figuring Lenses," Ser. No. 813,641 and "Discrete Aperture Method of Making Synthetic Kinoforms and Holograms," Ser. No. 794,977, both by the inventors of the present invention and assigned to the assignee of this application.

Thus, while basic kinoform filtering systems overcome most of the problems discussed above which are associated with coherent systems, i.e., cost, complexity, noise, bandwidth, and no real-time processing, the available applications are limited to real, positive operators. Since many standard processing techniques require the use of operators which may be negative or even complex, the extension of incoherent filtering systems to these types of operators is highly desirable.

SUMMARY OF THE INVENTION

Briefly, a filter operator to be implemented is mathematically defined. The operator may, for instance, be a velocity fan filter for use in analyzing seismic traces. This type of filter is well known in the seismic data manipulation art. One fan filter technique was described in a paper presented at the thirty-eighth Society of Exploration Geophysicists Convention in Denver, Colorado on Oct. 7, 1968 by J. C. Patau. As there described, the filter is represented by a matrix of values and this matrix is digitally convolved on the digitized traces to be processed.

In the present invention in the preferred embodiment, the matrix of values is processed and a constant added such that all of the values are real and nonnegative and the required phase to represent this matrix calculated and plotted. The plot is then photoreduced and bleached to provide the kinoform filter. The phase calculation, plotting and bleaching are as described in the aforementioned patent application, Ser. No. 778,525.

During actual filtering the object to be filtered such as a transparency having seismic traces thereon is illuminated with incoherent light which preferably is color filtered and diffused. The light scattered by the object then passes through the filter and the resultant filtered image, imaged by means of a lens.

Other alternate embodiments including one in which the incoherently illuminated object to be filtered is scanned through the filter and displayed on a cathode-ray tube such that real time processing is accomplished, are also provided.

DETAILED DESCRIPTION OF THE DRAWINGS

Figure 1:
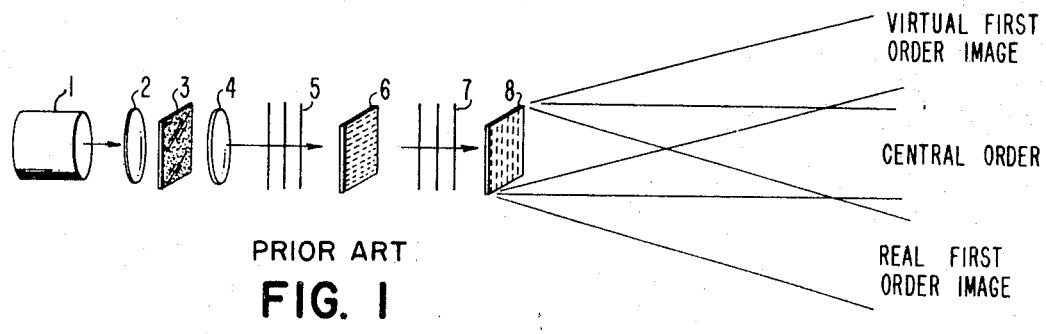
FIG. 1 is an illustration of a typical holographic coherent information-processing system.

To aid in an appreciation and understanding of the subject novel technique, refer first to FIG. 1, where there is an illustration of a coherent optical processing system, using holographic members. While this system is described in detail in the aforementioned Applied Optics reference and Goodman text, a brief description will be given to aid in an appreciation of the present incoherent filtering system. In FIG. 1, a light source 1 such as a laser provides a coherent, monochromatic wave front which is shaped into a plane or spherical wave front 5 by an objective lens 2, spatial filter 3 and collimating lens 4. The wave front 5 illuminates the object 6 which contains data which is to be filtered; i.e., a convolutional operation is to be carried out on the one-, two-, or three-dimensional data. As illustrated in FIG. 1, the data is carried on a transparency such that a coherent wave front is scattered from it. The wave front 7 illuminates the holographic member 8. Most of the light is transmitted in the central diffraction order, while relatively little is transmitted in the first order. The desired filtered image appears in the real first order.

As briefly discussed above, this type of filtering or processing system has many attendant disadvantages such as high cost and complexity. Additionally, for many applications it is made impractical by its requirement, due to the use of coherent light, of very accurate alignment and extreme stability which necessitate an optical bench and a skilled craftsman. Also, the requirement that orders be separated limits the spatial location of the image, which in turn limits the size and/or resolution of the object (data) to be filtered. Finally, not only is there an inefficient use of light in that most of the incident light is diffracted into the central order, but additionally, real-time processing is precluded due to the requirement that the data to be filtered must be reduced to photographic form such that it can be caused to transmit coherent illumination.

Several attempts have been made in the past to make holographic filtering more practical. Since all of the above listed problems arise from the use of coherent light, attempts have been made to construct incoherent systems. These systems have approximated coherent light by viewing only a small area and have been unsatisfactory due to poor image quality.

Figure 2:
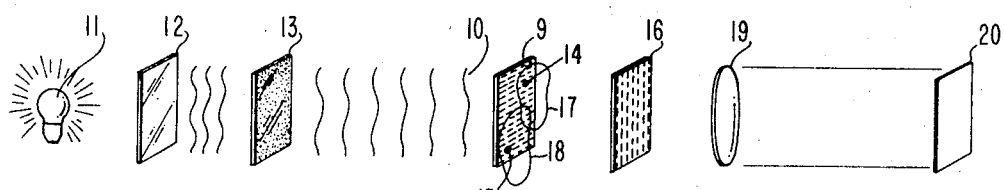
FIG. 2 is an illustration of one embodiment of the subject novel incoherent kinoform information-processing system.

Many of the above problems are overcome by the basic kinoform filtering technique which is the subject of the aforementioned patent application. In FIG. 2 is illustrated the basic kinoformic incoherent filtering system. As illustrated, the transparency 9 containing the data to be filtered is illuminated by quasi monochromatic, temporally incoherent waves 10. The waves 10 emanate from, for instance, an incandescent light 11 and prior to their arrival at the object 9 are color filtered by filter 12, such that only waves of the spectrum for which the kinoform filter 16 was designed are passed. The waves are also passed through a diffuser 13.

The object 9 can be thought of being made up of many point sources, with each point source of a specified intensity and with a phase varying with time, i.e., temporally incoherent. The points 14 and 15 represent two such point sources. Each point source 14, 15 illuminates the kinoform 16 which in turn produces a virtual image 17, 18 positioned as shown relative to the position of the point source and whose intensity is proportional to the intensity of the point source. Stated mathematically, if $F(a,b,z)$ is the intensity of the point at $(a,b,z)$ of the virtual image from the kinoform produced by a point source of unit intensity at the point $(0,0,0)$, then a distribution of sources with intensity $|\theta(x,y,z)|^2$ will produce a virtual image whose intensity is $|\theta(x,y,z)|^2 F(a+x,b+y,z)$ at the point $(a,b,z)$. Since energy (intensities) are accumulative in incoherent light, the total intensity at point $(a,b,z)$ is given by the equation $$\sum_{z}\sum_{x}\sum_{y} |\theta(x, y, z)|^2 F(a+x, b+y, z)$$

If a lens 19 is used to image this virtual pattern onto a screen or other image recording device 20, then the pattern becomes $$\sum_{z}\sum_{x}\sum_{y} |\theta(x, y, z)|^2 F(a-x, b-y, z)$$

These two cases can be thought of as correlation or convolutional filtered objects. This system has numerous advantages such as it is relatively low in cost and is not complex in that it has neither the extreme alignment nor imaging requirements of a coherent system. Additionally, there is no noise problem from microscopic dust particles or flaws in the optics since these are averaged out in an incoherent system. Furthermore, real-time processing can be accomplished since it is possible to use real-time data. That is, the data to be processed can be displayed on a cathode-ray tube and the light from the CRT phosphor used as the illumination. Also, since it is a single-order system there is no overlapping order problem which limits the size of the object to be filtered and therefore very large objects can be filtered using very small filters.

Although this system has great advantages for optical information processing, as above discussed, its applications are limited by the fact that the function F consists of intensities which are nonnegative. Negative intensities have no meaning, and thus operators which are in part negative cannot be used in the system of FIG. 2.

It should be understood in connection with FIGS. 2, 4–6 that the term incoherent light is used in its true sense. That is, while as illustrated in these figures, for purposes of quality, a diffuser and color filter are used along with a "separate" source of incoherent light, these members are not required. The ordinary ambient light reflected from a piece of paper having the data to be filtered printed on it is sufficient. In this type of simple set up the data is viewed through the kinoform filter and the eye constitutes the lens or assuming that the ambient light is great enough, the filtered image is scanned through the filter.

Further with respect to color filtering, while in good quality systems this is desirable, it is not necessary. That is, the kinoform filters which have actually been constructed have been "tuned" for use with red light. These filters have been satisfactorily used in systems where the only light is reflected light from normal fluorescent lights and with illumination from a black-white CRT display.

The novel invention described hereinafter provides several techniques for using the very great simplification inherent in the kinoformic optical processing system of FIG. 2 for *all* convolutional operators regardless of whether the operator values are positive or negative, as well as for certain nonlinear ones. These novel techniques allow for the application of one-, two-, or three-dimensional operators to one-, two-, or three-dimensional objects (data sets). Because the kinoform can be used for nonoptical waves, e.g., nonvisible electromagnetic waves, sound waves, information-processing systems using those media may also be constructed using techniques analogous to those herein described.

Figure 3:
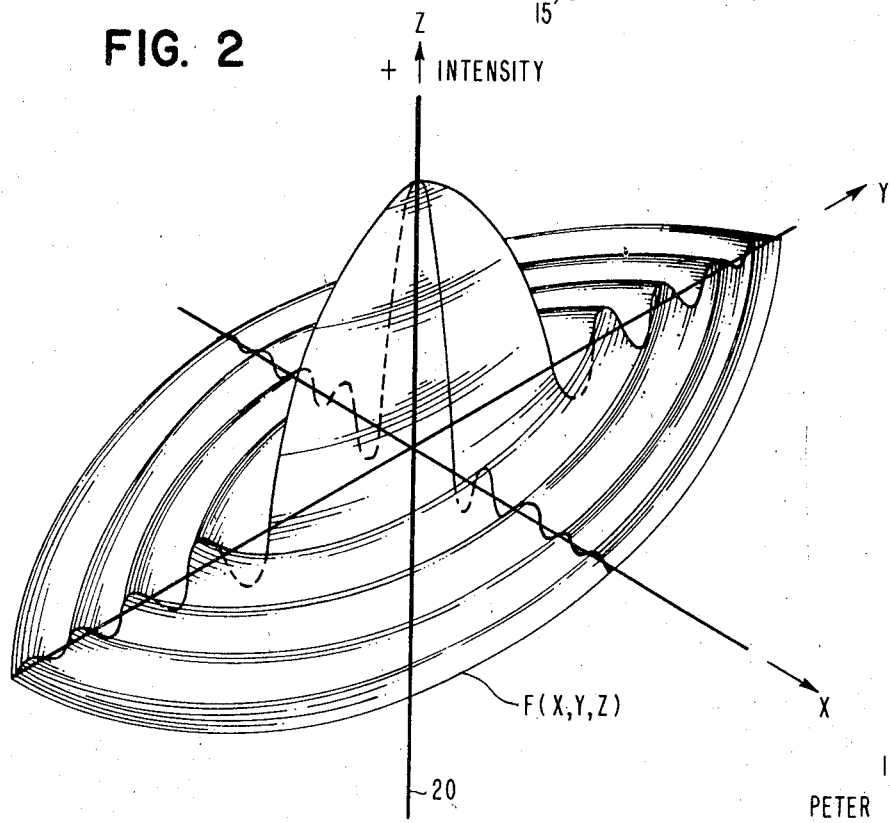
FIG. 3 is an illustrative linear mathematical operator, the impulse response of a fan filter.

To facilitate a description of the present novel technique, consider the operator illustrated in FIG. 3. This operator is a single example of a large class of mathematical convolutional operators. Some examples of convolutional operators are matched operators, inverse operators, cross-correlation operators, deconvolution operators, fan-filtering operators, autocorrelation operators, band-pass operators, high-pass operators, notch operators, reject operators, and low-pass operators.

Many of these examples have negative regions, which cannot be represented directly in a kinoform. Some have both negative and complex regions, which present even greater problems.

The novel invention described herein provides a technique of using a kinoformic incoherent optical processing system for processing using a convolutional filter limited to three or fewer dimensions.

In the first embodiment, a general real convolutional operator, for example the fan-filtering operator $F(x,y,z)$ illustrated in FIG. 3, can be applied optically, using a kinoform. In this case the operator has some minimum value 20 which will be referred to as C. If a constant number C is added to the operator $F(x,y,z)$, the resulting operator $F'(x,y,z)=F(x,y,z)+C$ is everywhere nonnegative. If a kinoform is produced in which the amplitude of the virtual image is given by the function $(F'(x,y,z))^{1/2}$, it can be used in the system illustrated in FIG. 2. The square rooting is required since the square of the amplitude equals the intensity. If the amplitude of the light passed through the object is given by $\theta(x,y,z)$ then the intensity distribution at a detector screen is $$G(a, b, c) = \sum_{xyz}\sum\sum |\theta(x, y, z) \sqrt{F(a-x, b-y, c-z)+C}|^2$$

$G(a,b,c)$, the processed image can also be written as $$\sum_{xyz}\sum\sum |\theta(x, y, z)|^2 F(a-x, b-y, c-z) + \sum_{xyz}\sum\sum |\theta(x, y, z)|^2 C$$

The first term is the desired convolution of $\theta(x,y,z)$ with the operator $F(a-x, b-y, c-z)$. The second term is a constant. If the second term is called K, $$K = \sum_{xyz}\sum\sum |\theta(x, y, z)|^2 C$$

then this constant K can best be removed from the observed image $G(a,b,c)$ in real time by placing a vidicon tube or other TV type camera tube in scanning alignment with the kinoform and by electronically subtracting a voltage equal to that produced by the illumination K. Biasing techniques for voltage subtraction are common in electronics technology.

Thus, the difference between the basic kinoform filtering system and the present system is twofold. The first difference is in the manner of calculating the filter, i.e., the addition of the constant and the second difference is in the manner of utilization of the filtered data. That is, with respect to the second difference, the bias or constant added in most cases must be removed. To accomplish removal of this bias, the preferred manner is by electronic means. Thus, the lens 19 of FIG. 2 would in this case represent the lens of a scanner such as a vidicon and the resultant image displayed at 20 which would constitute the face of a display tube such as a CRT. Such a system is illustrated in FIG. 4 in which as shown the light source 11, color filter 12, diffuser 13, data member 9 and kinoform filter 16 are operative to produce a virtual image 17 and 18 which is scanned by vidicon 22 which has its output bias adjusted and amplified at 23 for display at 24.

Removal of the constant term K can also be accomplished using very carefully controlled photographic techniques in which the nonlinearities of the emulsion and developing method are used to suppress the constant signal. Obviously this variation of the first embodiment precludes real-time data processing and would require a skilled photographer, whereas the vidicon variation requires little skill of the operator.

Figure 4:
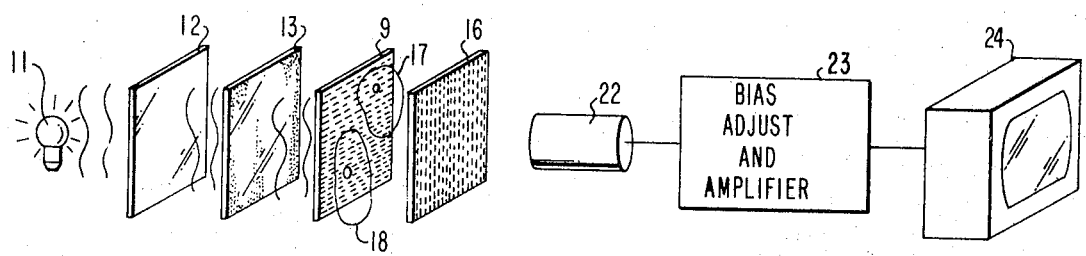
FIG. 4 is a view illustrative of the preferred systems embodiment of the subject invention.

Again, in connection with FIG. 4, as above mentioned, the data member 9 could be either a photographic transparency or could be the face of a display tube. In the event that 9 were the face of a display tube, color filtering, if desired, could be accomplished by the choice of phosphors. The light source 11 would be that furnished by the display and a good amount of diffusion is inherent in CRT displays.

Figure 5:
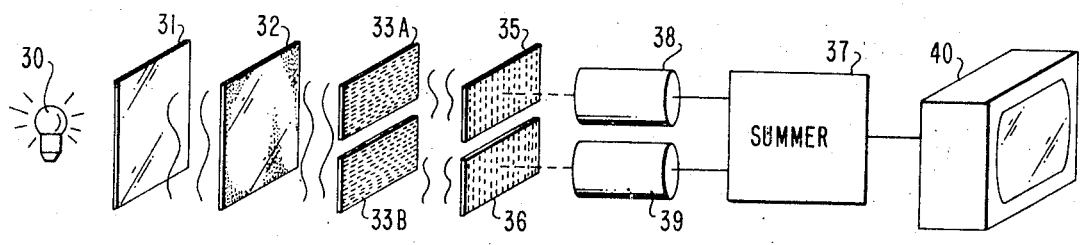
FIG. 5 is an alternate embodiment in which both positive and negative filters are used to produce a convolutional filter.

In the second embodiment, as illustrated in FIG. 5, light emanates from the light source 30, passes through a color filter and a diffuser 32 and is scattered by the data to be filtered which is on transparencies 33a and 33b. Transparencies 33a and 33b contain identical data. The light scattered in each transparency 33a and 33b, then passes through two filters, 35 and 36, respectively. One filter includes all the nonnegative values of the operator and the second filter includes the negative of all the negative values of the operator, that is for instance $$\text{Filter } 35 = P(x, y, z) = \begin{cases} F(x, y, z) \text{ where } F(x, y, z) \geq 0 \\ 0 \text{ elsewhere} \end{cases}$$

$$\text{Filter } 36 = N(x, y, z) = \begin{cases} -F(x, y, z) \text{ where } F(x, y, z) < 0 \\ 0 \text{ elsewhere} \end{cases}$$

Note that $$F(x,y,z)=P(x,y,z)-N(x,y,z)$$

The results are combined either optically or electronically at 26. As illustrated, the light transmitted by each filter 35 and 36 is detected by a vidicon 38 and 39, respectively, and the summed result displayed at 40. This process is $$\sum_{xyz}\sum\sum |\theta(x, y, z) \sqrt{P(a-x, b-y, z)}|^2$$

$$-\sum_{xyz}\sum\sum |\theta(x, y, z) \sqrt{N(a-x, b-y, z)}|^2$$

$$= \sum_{xyz}\sum\sum |\theta(x, y, z)|^2 P(a-x, b-y, z) - N(a-x, b-y, z)$$

$$= \sum_{xyz}\sum\sum |\theta(x, y, z)|^2 F(a-x, b-y, z)$$

Again, as mentioned with respect to the other embodiments, the data to be filtered could be displayed, for real time processing on a CRT display.

Figure 6:
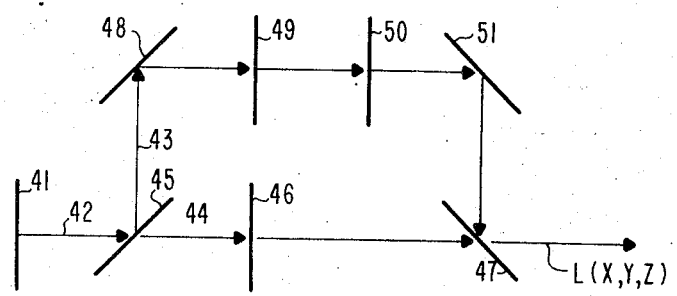
FIG. 6 is an optical system which could be used to accomplish optically the electronic summing of the system of FIG. 5.

In FIG. 6 there is shown an illustration of an optical system which could be used to accomplish the summing. In this embodiment monochromatic light and equal path lengths would have to be used to assure accuracy in the subtraction. Thus, as illustrated symbolically, the data-scattered incoherent light 42 from data member 41 is divided into two beams 43 and 44 by a beam splitter 45. Beam 44 passes through the positive filter 46 and thence through a half-silvered mirror where it is combined with beams 43 which has been reflected by a mirror 48, through the negative filter 49 which produces $N(x,y,z)$, through the half-wave plate 50 to produce $-N(x,y,z)$ which is then reflected from mirrors 51 and 47 to produce $F(x,y,z)$ as indicated by the arrow.

This is exactly the result desired of convolving the intensities of the image with the general convolution operator.

It is also possible to produce complex operators by using four filters, two filters as mentioned for the real part of the function and two additional filters $PI(x,y,z)$ and $WI(x,y,z)$ for the imaginary parts of the filter. These filters can be combined optically to produce the desired operator. Mathematically, this can be described as $$\sum_{xyz}\sum\sum |\theta(x, y, z) \sqrt{P(a-x, b-y, z)}|^2$$

$$-\sum_{xyz}\sum\sum |\theta(x, y, z) \sqrt{N(a-x, b-y, z)}|^2$$

$$+i\left[\sum_{xyz}\sum\sum |\theta(x, y, z) \sqrt{PI(a-x, b-y, z)}|^2\right.$$

$$\left.-\sum_{xyz}\sum\sum |\theta(x, y, z) \sqrt{NI(a-x, b-y, z)}|^2\right]$$

$$= \sum_{xyz}\sum\sum |\theta(x, y, z)|^2 F(a-x, b-y, z)$$

Figure 7:
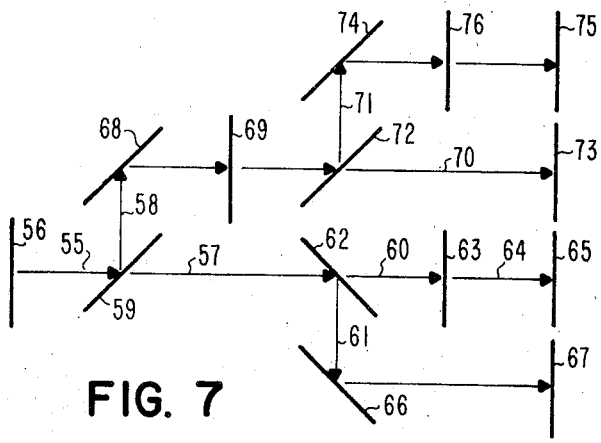
FIG. 7 is an optical system which could be used in the system of FIG. 5 for processing complex numbered operators.

Optically, this can be implemented as illustrated in FIG. 7. There, data-scattered incoherent light 55 from data member 56 is split into two beams 60 and 61 by beam splitter 62. Beam 60 then passes through quarter wave plate 63 to provide the data-scattered light 64 for filter 65 which is the positive complex filter. Beam 61 is reflected from the mirror and provides the data-scattered light for the positive filter 67.

Beam 58 is reflected from mirror 68, through half-wave plate 69 and is split into two beams 70 and 71 by beam splitter 72. Beam 70 provides the data-scattered light for filter 73 which is the negative filter. Beam 71 is reflected by mirror 74 and after passing through quarter wave plate 75 provides the data-scattered light for filter 75.

The output from the optical system would be obtained by combining the light from filters 65, 67, 73, and 75 in a manner opposite to that just described for the input.

In summary and to tie in the aforereferenced kinoform technique which is described in patent application Ser. No. 778,525, a discussion of the calculation and construction of a filter will be provided.

During calculation of the filter, the impulse response function is considered to be a three-dimensional array of point apertures. Each aperture is assigned a value between zero and one, where zero implies that no light is transmitted through the aperture, one implies an open aperture, and the values between represent the relative transmittance of the apertures. These values are made to correspond to the square root of $F(x,y,z)$ or $F'(x,y,z)$, depending upon the embodiment. These values are read into a calculating machine, using, for example, punched cards, and a plot tape is generated. In the remainder of this discussion, the first embodiment and a one-dimensional treatment will be given for simplicity.

The first step in generating the plot tape is to discretize the impulse response function into a vector of $m$ elements to multiply each element $\sqrt{F'}_j$ of the $\sqrt{F'}$ array by a phase factor $e^{i\phi j}$, from a random or selected distribution. Then letting $$T(x_j) = \sqrt{F'}_j \, e^{i\phi j},$$

the next step is to use the discrete form of the Kirchhoff diffraction formula to calculate the wave front at the kinoform filter position required to reproduce the impulse response function $F'$. In the Fresnel approximation, this is accomplished by calculating $$TE(l/p) = \sum_{j=-m/2}^{m/2-1} T(x_j) e^{iK \, (\Delta x)^2 j^2} e^{-i2\pi(l/p)j/m}$$

In the calculations, zeros are appended to the $F'$ array so that it is a vector of $n$ elements. This interpolates the $TE$ (transform) array:

$$TE(l/p) = \sum_{j=-n/2}^{n/2-1} T(x_j) e^{iK \, (\Delta x)^2 j^2} e^{-2\pi i l j/n}$$

where $n=pm$, and $T(x_j)=0$ for $n/2 \leq j < -m/2$ and for $m/2 \leq j \leq n/2-1$. $l$ has the range from $-n/2$ to $(n/2)-1$.

Since the $TE$ array is of period $n$, it may be repeated as many times as necessary, to provide a filter as large as desired. The $TE$ array has the form of $$TE_{l/p} = A(l/p) e^{i\omega(l/p)}.$$

In the generation of the kinoform filter, only the phase $\omega(l/p)$, mod $2n\pi$ is used; the amplitude $A(l/p)$ is assumed to be constant.

The introduction of the phase factor $\exp[i\Phi(a,b)]$, which simulates the ground glass or the point aperture format alleviates the need for considering amplitude in the calculation.

The phase $\omega(l/p)$ is plotted on a plotter with, for instance, 32 gray levels, such that the phase ranges from 0 to $2\pi$ over the scale. The plot is then photoreduced to the appropriate size, governed by the wavelength of light used, and the design distance from the data to be filtered to the filter. The photoreduced device is then etched, for example, with Kodak etch bath EB-3. The etch bath etches the surface of the photoreduction in proportion to the darkening of the photographic reduction. The etching of the photoreduction for a kinoform filter must be performed with much more care than is required for conventional bleached holograms. The relief of the emulsion must be such that light incident upon a region of $\Phi=0$ will be retarded by one wavelength, compared with the light incident upon a region of $\Phi=2\pi$. When phase matching is achieved, almost all of the light incident upon the kinoform filter will present in the desired impulse response function with no spurious orders.

While the subject invention has been described systemwise with the filter being photographically produced, due to the noncriticality of the required light, both the filter and the data could be real-time displayed. This could be accomplished with two deformographic storage display tubes, one for displaying the object to be filtered and a second to display the desired kinoform. The displays could come from a vidicon or a computer to allow real-time filtering.

Additionally, it will be obvious to those skilled in the art that the subject invention is equally applicable to other than the optical-type applications herein described. Thus, for instance, sonic and ultrasonic filters could be readily implemented. In this event, however, as will be obvious the filter, while being calculated in exactly the same manner as herein described, would be made of different materials, depending on the application. Therefore, other techniques such as cutting and milling, rather than bleaching would be employed.

While the invention has been particularly shown and described with reference to several embodiments, it will be understood by those skilled in the art that various changes in form and detail may be made without departing from the spirit and scope of the invention.

What is claimed is:

1. A method of performing the mathematic convolution between a three-dimensional convolutional operator and a three-dimensional function by processing physical incoherent waves emanating from a physical amplitude distribution with a processing member to produce a zero diffraction order output at an output plane comprising the steps of:

A. representing said function by a real physical object which when illuminated by a wave front scatters said wave front according to said amplitude distribution to provide said physical incoherent waves;

B. discretizing said convolutional operator across a three-dimensional matrix to obtain a matrix of positive values;

C. effectively removing any negative value from said matrix of values by adding a positive constant to all of said values to form a matrix of nonnegative values;

D. constructing said processing member according to the processes for making a kinoform wherein said discretized convolutional operator is considered to be the intensity of the image projected by said kinoform;

E. illuminating said processing member with said physical incoherent waves to selectively retard said waves with resultant interference at said output plane in the zero diffraction order corresponding to said convolution; and F. compensating for said positive constant added in step (C) by subtraction of a bias from said convolution at said output plane.

2. The method of claim 1 wherein said physical incoherent waves are incoherent light waves such that optical distribution of energy occurs at said output plane.

3. The method of claim 2 wherein the resultant distribution of energy at said output plane is scanned by a vidicon for subsequent display and prior to display a negative bias corresponding to the constant added to said matrix of values is added.

4. The method of claim 3 wherein said processing member is made of a material of substantially uniform transmissivity but with selectively varied thickness corresponding to said controlled phase retarding areas.

5. The method of claim 4 wherein said selectively varied thickness is obtained by calculating the phase distribution required to produce said operator in optical form at said output plane with the assumption that said physical incoherent light waves are from a point source, plotting said calculated phase distribution as amplitude on a multigrey level plotter, photoreducing said plot and bleaching said photoreduction.

6. The method of claim 5 wherein said physical incoherent light waves are provided by a cathode-ray tube having displayed thereon said data to be processed.

7. The method of claim 5 wherein said physical incoherent waves are provided by illuminating said data in visual form with incoherent light.

* * * * *